T. W. Moore
Culinary Apparatus.
Nº 73,630. Patented Jan. 21, 1868.
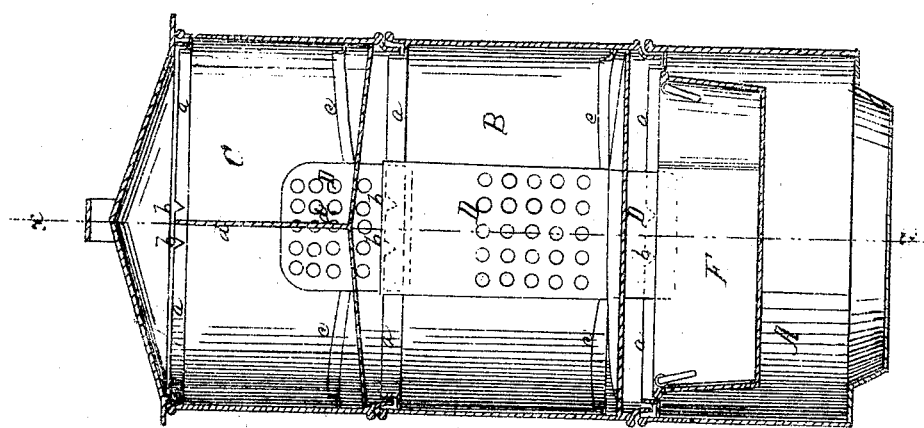
Fig. 2
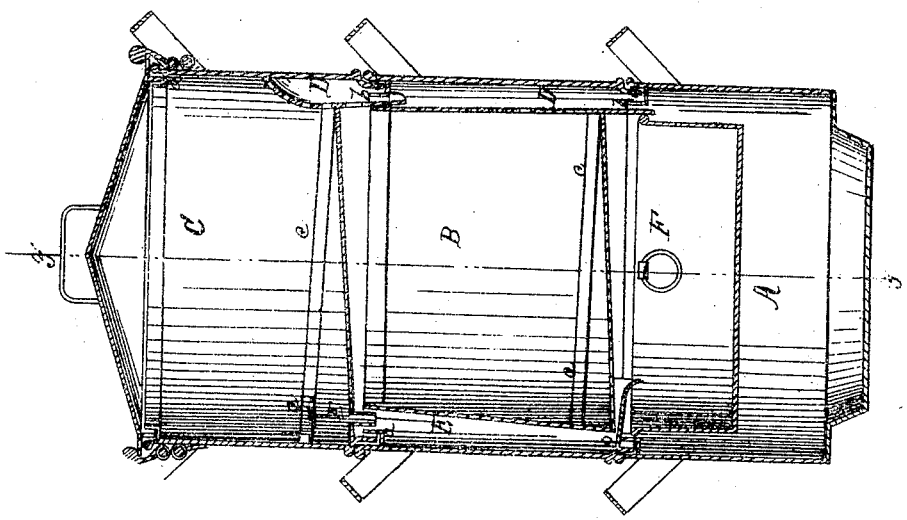
Inventor
T. W. Moore
Per Munn & Co
Attorneys

United States Patent Office.

T. W. MOORE, OF NEW YORK, N. Y.

Letters Patent No. 73,630, dated January 21, 1868.

IMPROVEMENT IN CULINARY APPARATUS.

The Schedule referred to in these Letters Patent and making part of the same.

TO ALL WHOM IT MAY CONCERN:

Be it known that I, T. W. MOORE, of the city, county, and State of New York, have invented a new and improved Culinary Apparatus; and I do hereby declare that the following is a full, clear, and exact description thereof, which will enable others skilled in the art to make and use the same, reference being had to the accompanying drawings, forming a part of this specification, in which—

Figure 1 represents a vertical central section of my invention, the plane of section being indicated by the line x x, fig. 2.

Figure 2 is a vertical central section of the same, the plane of section being indicated by the line y y, fig. 1.

Similar letters of reference indicate corresponding parts.

This invention relates to that class of culinary apparatus which consists of two or more vessels, set above another, the steam created in the lower vessel entering the others, so as to cook their contents.

The object of this invention is to so arrange the apparatus that the steam may have free access to all the vessels, but that it should not when condensed mix with the articles to be cooked, but should be conveyed back to the lower cooking-vessel. The liquid escaping from the articles to be cooked should be gathered separate from the condensed steam in a separate vessel.

The great objection heretofore found against similar devices was, that the juices of the meat or vegetables mixed with the condensed steam were carried with the same into the boiling water, and were then again evaporated, and carried up to the articles, so that the meat was cooked with steam containing vegetable matter, and the vegetables were cooked with steam containing juice of the meat, and thus a common taste was imparted to all articles, the originality of each becoming lost. To avoid this is the object of my invention.

For this purpose I provide a steam-way, which extends from the lower boiling-vessel to all the vessels above, being a perforated pipe. The steam created in the lower vessel enters all the other vessels, but when it condenses in the latter it is caught in inclined channels provided along the walls of the upper vessels, and is by them conducted back to the steam-way into the boiler. Even the steam condensed in the joints between two vessels will flow off into the steam-way through holes or recesses provided in the inner flange of the joint. The liquids flowing from the articles to be or being cooked, move on the inclined bottoms of the vessels to the lowest point or points of the vessels, and are there gathered in a pipe or outlet, by which they are conducted into a vessel arranged within or above the boiler for their reception. The liquid from each vessel may thus be gathered in a separate receptacle, or all, or any number of them together, in a common receptacle. The steam, although it is thus used to boil the articles, does not mix with the same, and the same remain therefore pure. The inclined bottoms do also form inclined covers to the vessels, by means of which the condensed steam receives a downward direction towards the sides of the vessels, and is gathered in the inclined channel and carried to the steam-way.

A represents the lower boiler. B is the next vessel set upon it. C is the next above. Any desired number of vessels may thus be used.

The joints between the vessels are formed as usual, that is, the lower edge of each vessel fits into a channel, a, formed in the vessel below, as shown. From the boiler A extends upward a perforated pipe, D, being formed as part of each upper vessel, either close to the walls or apart from the same, as may be desired. This vessel conveys the steam arising from the boiler to each one of the upper vessels. The inner flange of each channel a is perforated or recessed opposite the pipe D, if the same is partly surrounded by the walls of the vessels, and through these holes or recesses, b, the steam that may condense in the channel a is conveyed back through the pipe D to the boiler A. Near the bottom of each upper vessel, C B, is arranged, around the inside of their walls, an inclined channel, c, which conveys the steam that has been condensed on the walls of the vessel to the steam-pipe D. The bottoms of the vessels B and C are inclined either to one side or to two or more sides, as shown, and the liquids extracted from the articles to be cooked flow down on these inclined bottoms into a pipe, E, which has been arranged for their reception in the vessels B and C, as shown. By the pipe E these liquids are conducted into a vessel, F, which is arranged within the vessel A, as shown.

By having the bottom inclined to more than one side, the application of partitions, d, by which one vessel may be divided into two or more compartments, is made practicable, these partitions being removable. The inclined bottoms also serve to direct the condensed steam in the vessels below towards the walls and into the channels c, whence it is reconducted to the steam-pipe D.

If desired, a separate pipe may conduct the liquid from each vessel or compartment to a separate receptacle, and a separate pipe may conduct the steam from the boiler to each vessel B, and which pipe may, if desired, be arranged on the outside of the apparatus. The cover of the upper vessel should be held down by brackets or hooks, as shown, to prevent the steam from raising the cover.

Having thus described my invention, what I claim as new, and desire to secure by Letters Patent, is—

1. Providing the inner side of the channel a at the joints with holes or recesses, substantially as and for the purpose herein shown and described.

2. The inclined channels c, when arranged within the vessels B and C along their walls, for conducting the condensed steam back to the boiler, substantially as herein shown and described.

3. The steam-way D, when arranged as described, so as to convey the steam from the boiler into the upper vessels B C, and to reconduct the condensed steam to the boiler, as set forth, the steam-way being either attached to the upper vessel B C, or to the boiler, or both, as described.

4. The perforated pipe D, when arranged as set forth, in combination with the recessed or perforated flange of the channel a, and with the inclined channel or channels c, all made and operating substantially as and for the purpose herein shown and described.

5. Making the bottoms of the vessels B and C inclined to one or more sides, so as to guide the liquids to a certain desired point or points, as set forth.

6. I claim the vessels B C, having inclined bottoms, and provided with pipes E and steam-pipes D, in combination with a vessel, F, as and for the purpose described.

7. The vessels A B C, when provided with perforated channels a and steam-pipes D, and when otherwise made as described, in combination with the channel or channels c, pipe or pipes E, and vessel or vessels F, all made and operating substantially as herein shown and described.

T. W. MOORE.

Witnesses:
  WM. F. MCNAMARA,
  ALEX. F. ROBERTS.